United States Patent [19]

Wiederrich et al.

[11] 4,249,824
[45] Feb. 10, 1981

[54] APPARATUS FOR MEASURING WHEEL ALIGNMENT OF MOTOR VEHICLES

[75] Inventors: James L. Wiederrich, Lodi; Andrew K. Chang, Malibu; Julius J. Muray, Los Altos, all of Calif.

[73] Assignee: FMC Corporation, San Jose, Calif.

[21] Appl. No.: 913,779

[22] Filed: Jun. 8, 1978

[51] Int. Cl.³ .................... G01B 11/275; G02B 11/17
[52] U.S. Cl. .................................... 356/155; 350/6.1; 356/153
[58] Field of Search ............... 356/155, 152, 153, 138, 356/146, 147; 250/203; 33/288; 350/6.1

[56] References Cited

U.S. PATENT DOCUMENTS

| | | | |
|---|---|---|---|
| 2,213,605 | 9/1940 | Mathieu | 356/138 |
| 2,700,319 | 1/1955 | Carr | 356/155 |
| 3,363,504 | 1/1968 | Lill | 356/155 |
| 3,501,240 | 3/1970 | Haynes | 356/155 |
| 3,603,688 | 9/1971 | Smith-Vaniz | 356/172 |
| 3,630,623 | 12/1971 | Schirmer | 356/155 |
| 3,709,609 | 1/1973 | Spengler et al. | 356/155 |
| 3,724,950 | 4/1973 | Niss | 356/3 |
| 3,734,627 | 5/1973 | Edwards | 356/153 |
| 3,758,213 | 9/1973 | MacPherson et al. | 356/155 |
| 4,068,955 | 1/1978 | Bodlaj | 356/381 |

OTHER PUBLICATIONS

Johnson, B. K., "Optics & Optical Instruments", Dover Pub. 1960, pp. 6–8.

Primary Examiner—Paul A. Sacher
Assistant Examiner—Wm. H. Punter
Attorney, Agent, or Firm—Robert S. Kelly; John F. Verhoeven; Richard B. Megley

[57] ABSTRACT

The system of the present invention provides means for quick and accurate measurement of various wheel alignment parameters of motor vehicles by the use of reflected light beams. A laser source mounted near the front end of the vehicle provides a pair of light beams directed 180 degrees apart across the front end of the vehicle. Each of the beams is reflected along the side of the vehicle by a roof mirror set mounted near each front corner of the vehicle. The mirror sets each deflect a beam through a constant net angle of 90 degrees for a wide range of angles of incident light so that the laser source can be rotated to quickly provide parallel beams which are aligned substantially parallel to the sides of the vehicle. These mirror sets also provide stable beams and present small movements thereof from affecting the accuracy of the measurements being made. A pair of relay roof mirror sets, positioned adjacent the wheels whose alignment parameters are being measured, each reflects the beams onto flat mirrors pendulously mounted on the wheels. Each flat mirror returns the beam to the associated relay roof mirror set which, in turn, reflects the beam back to a grid-like light responsive target. The position of the return beam on the target causes the target to provide electronic output signals to logic circuitry which calculates the camber, caster and toe angle of the associated vehicle wheel.

13 Claims, 20 Drawing Figures

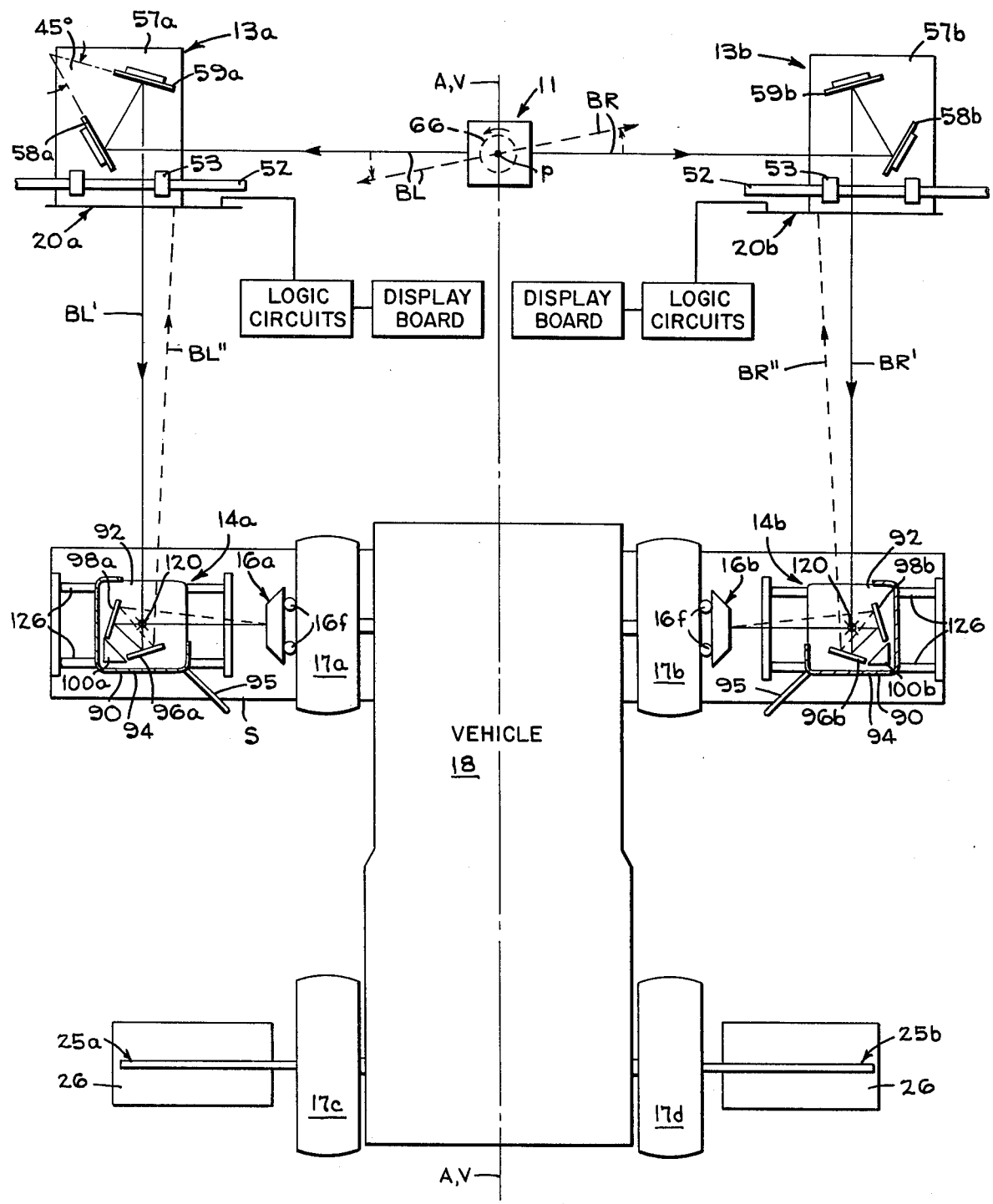
FIG_1

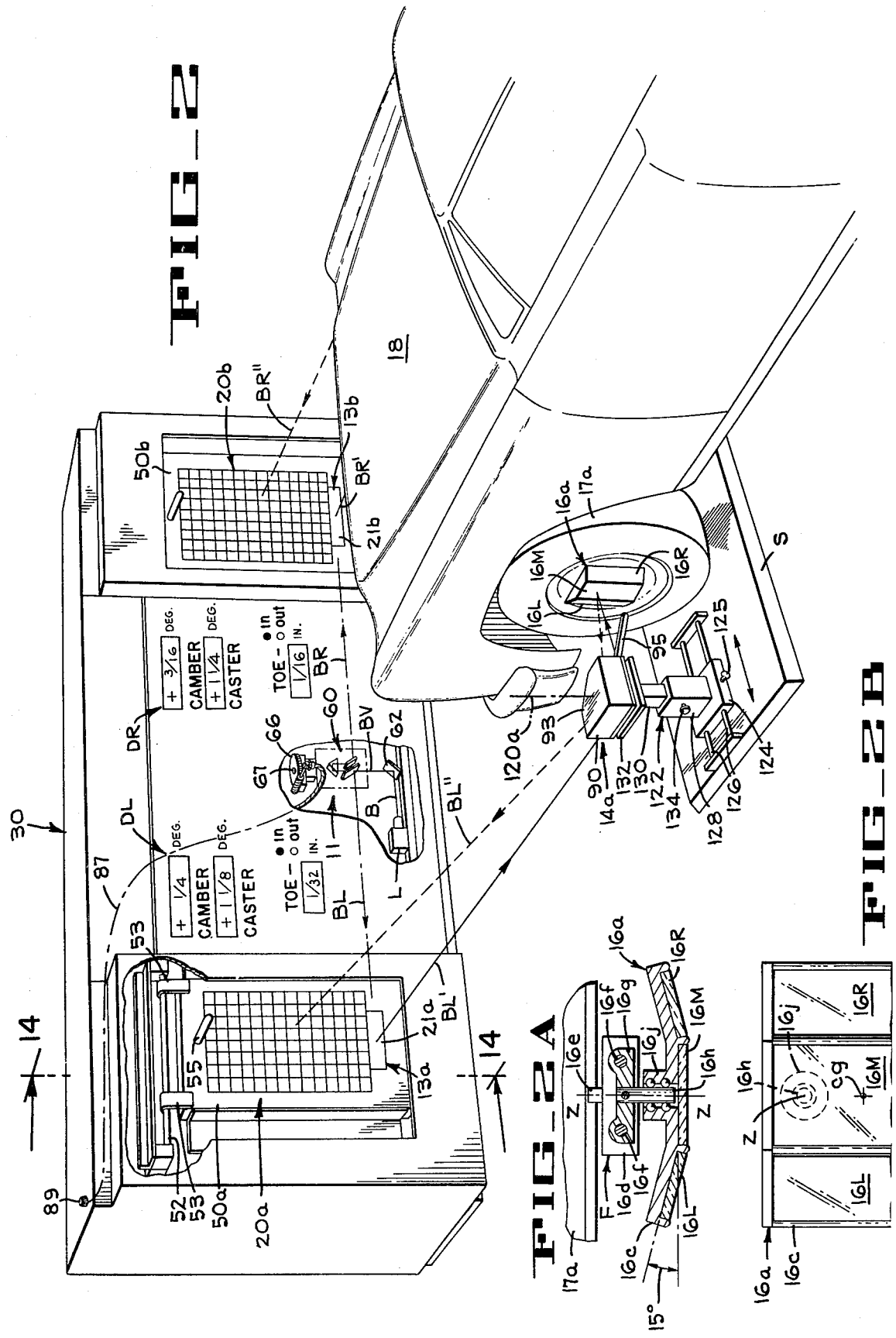

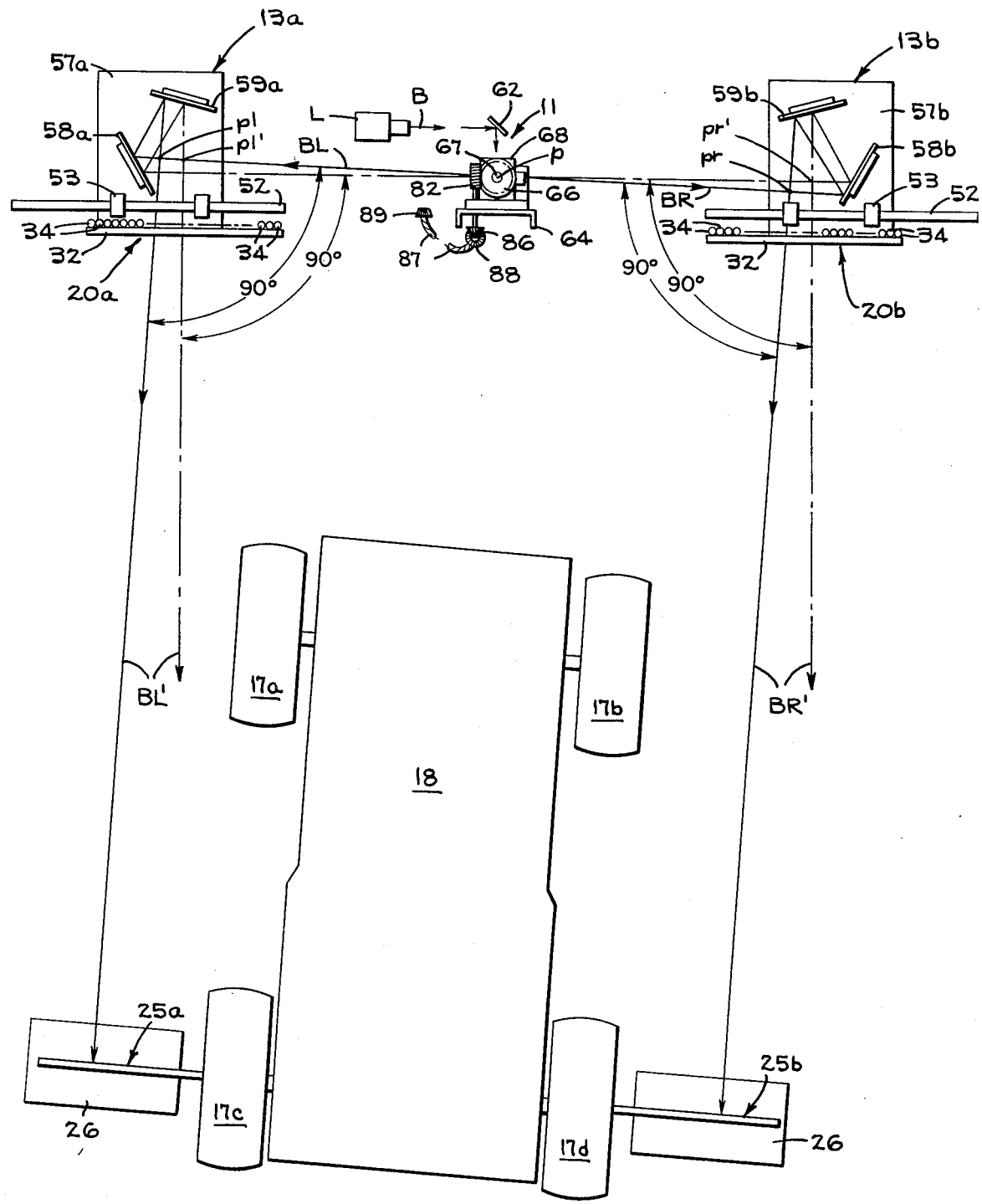
FIG_3

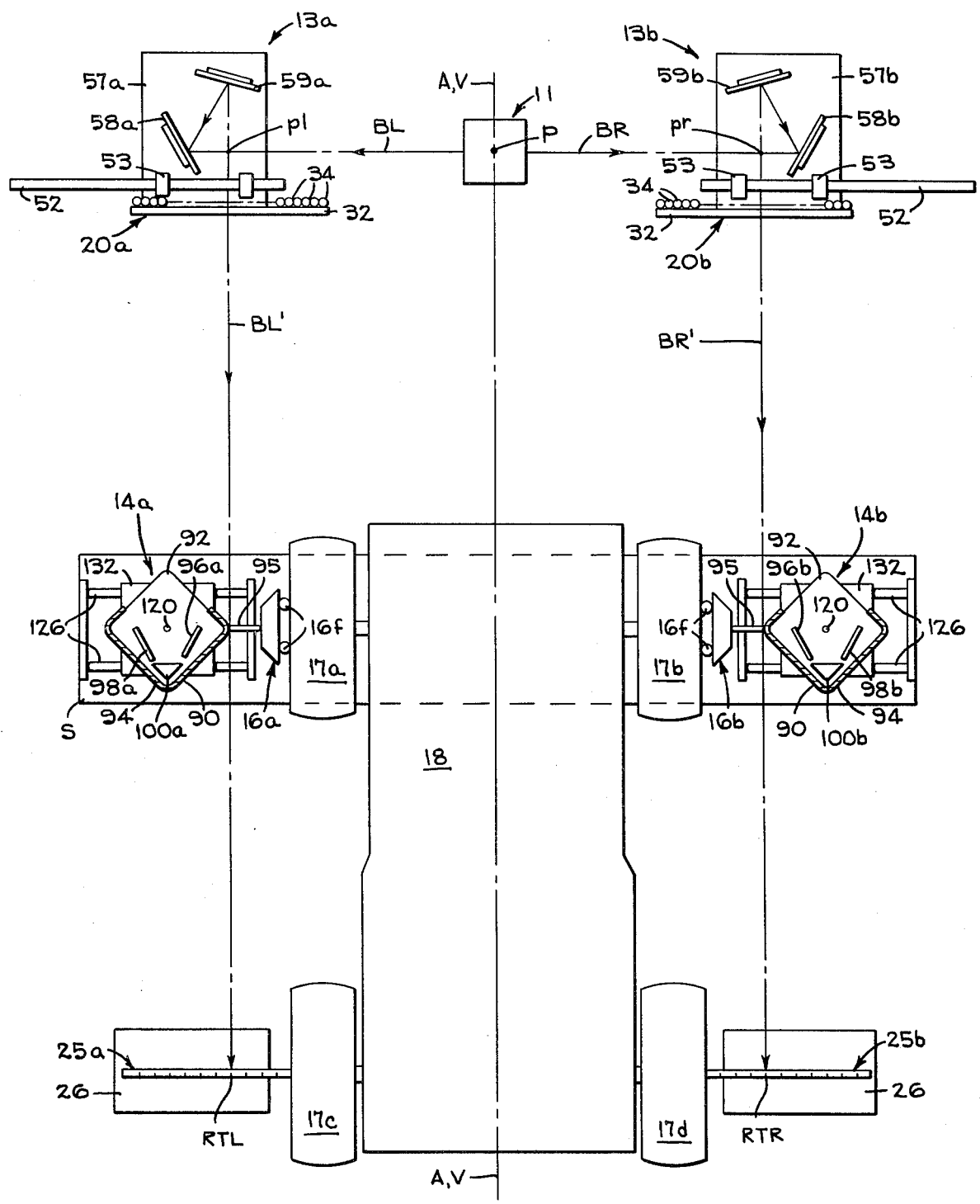

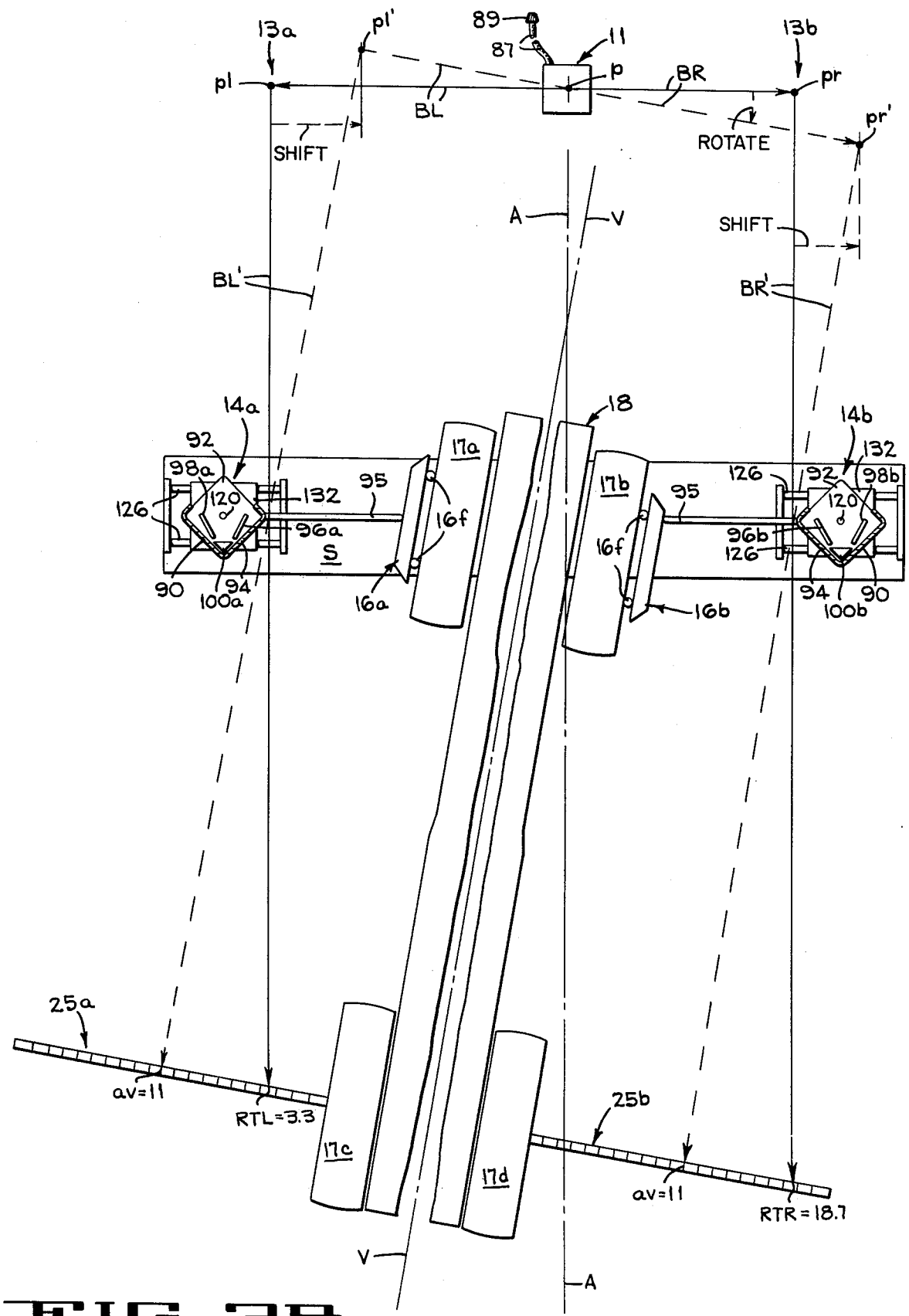
FIG_3B

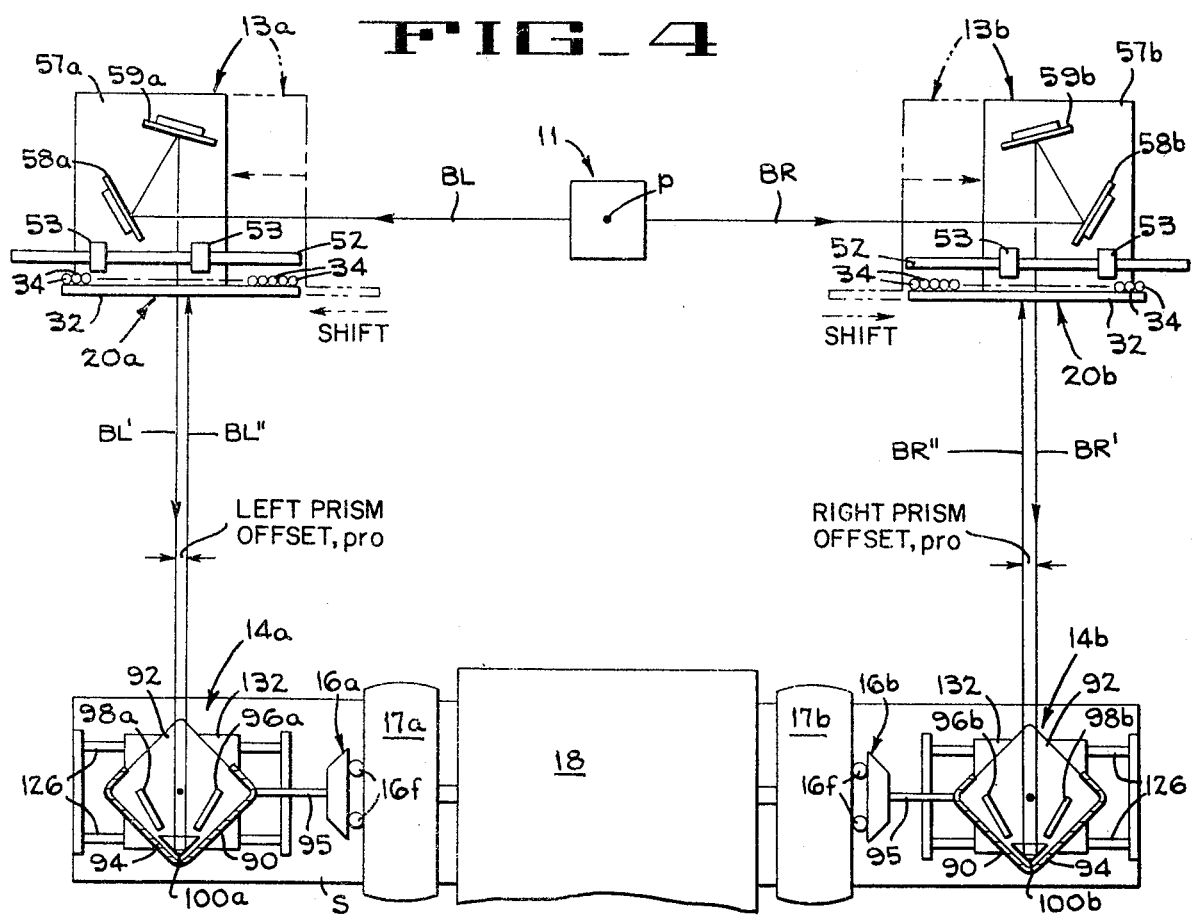
FIG_4
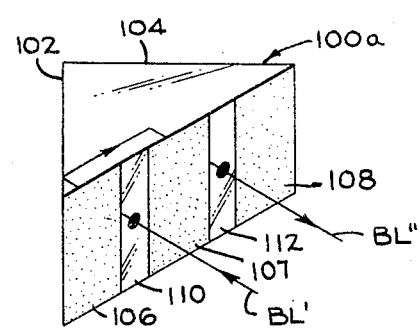
FIG_5
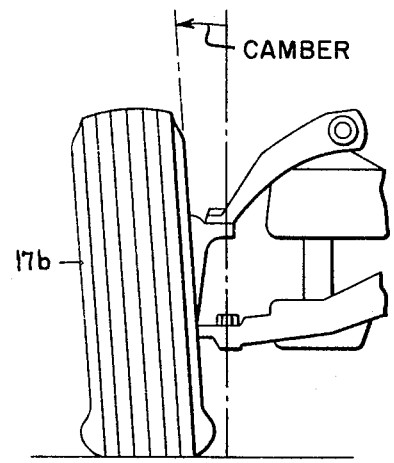
FIG_6
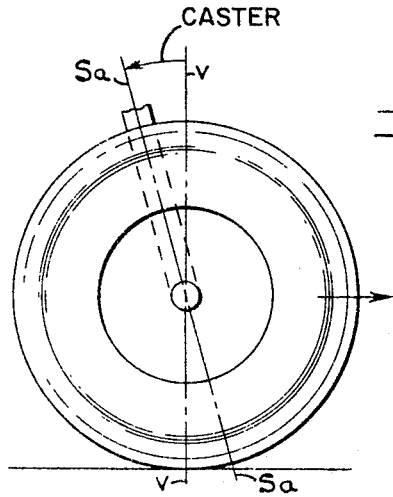
FIG_7

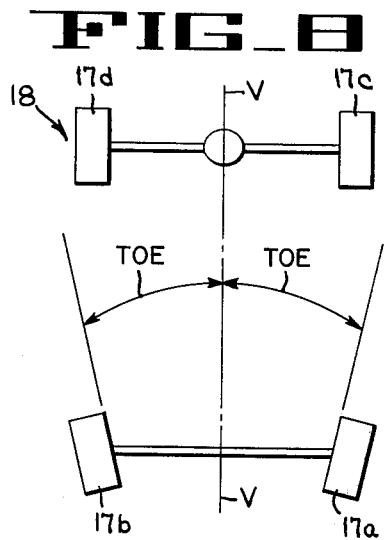
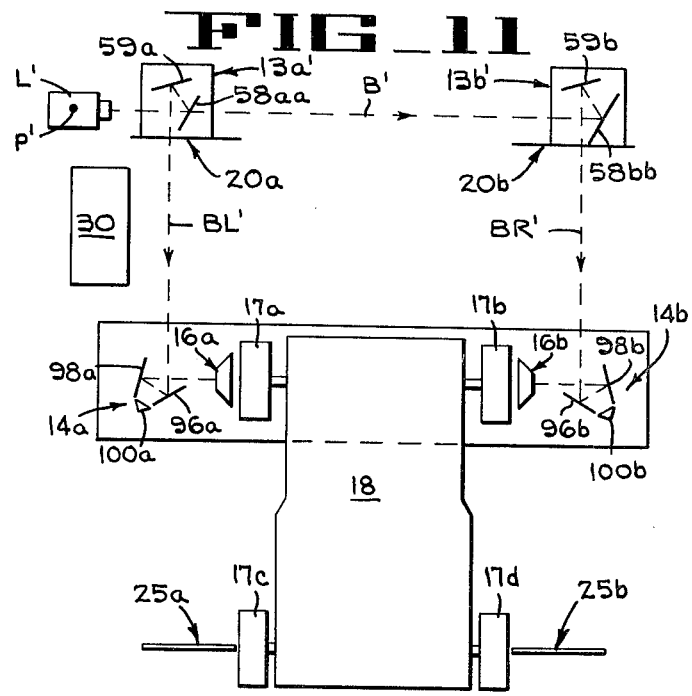
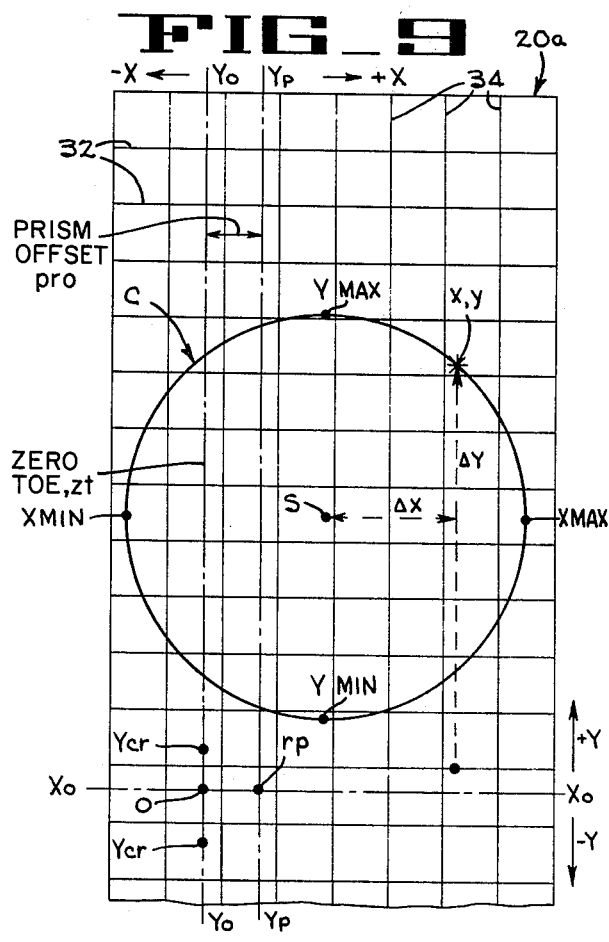
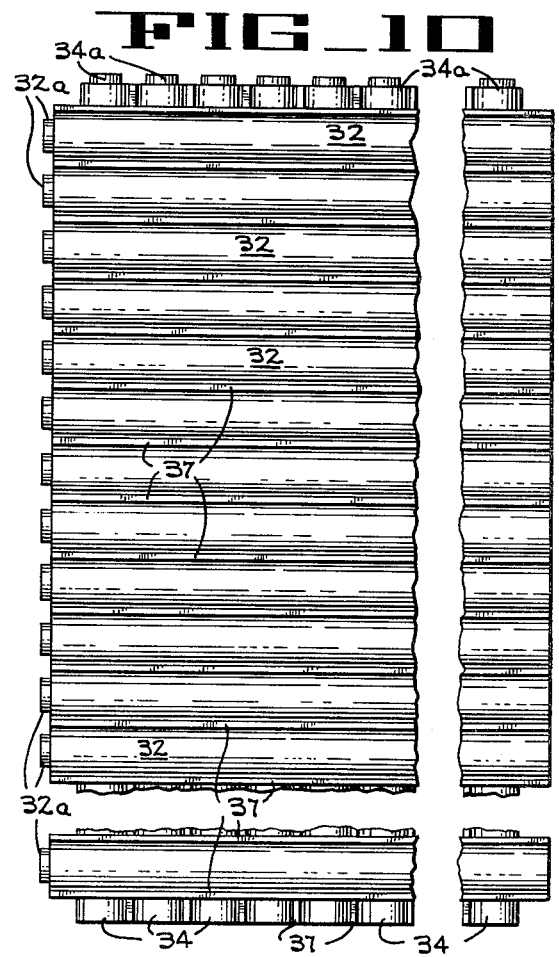

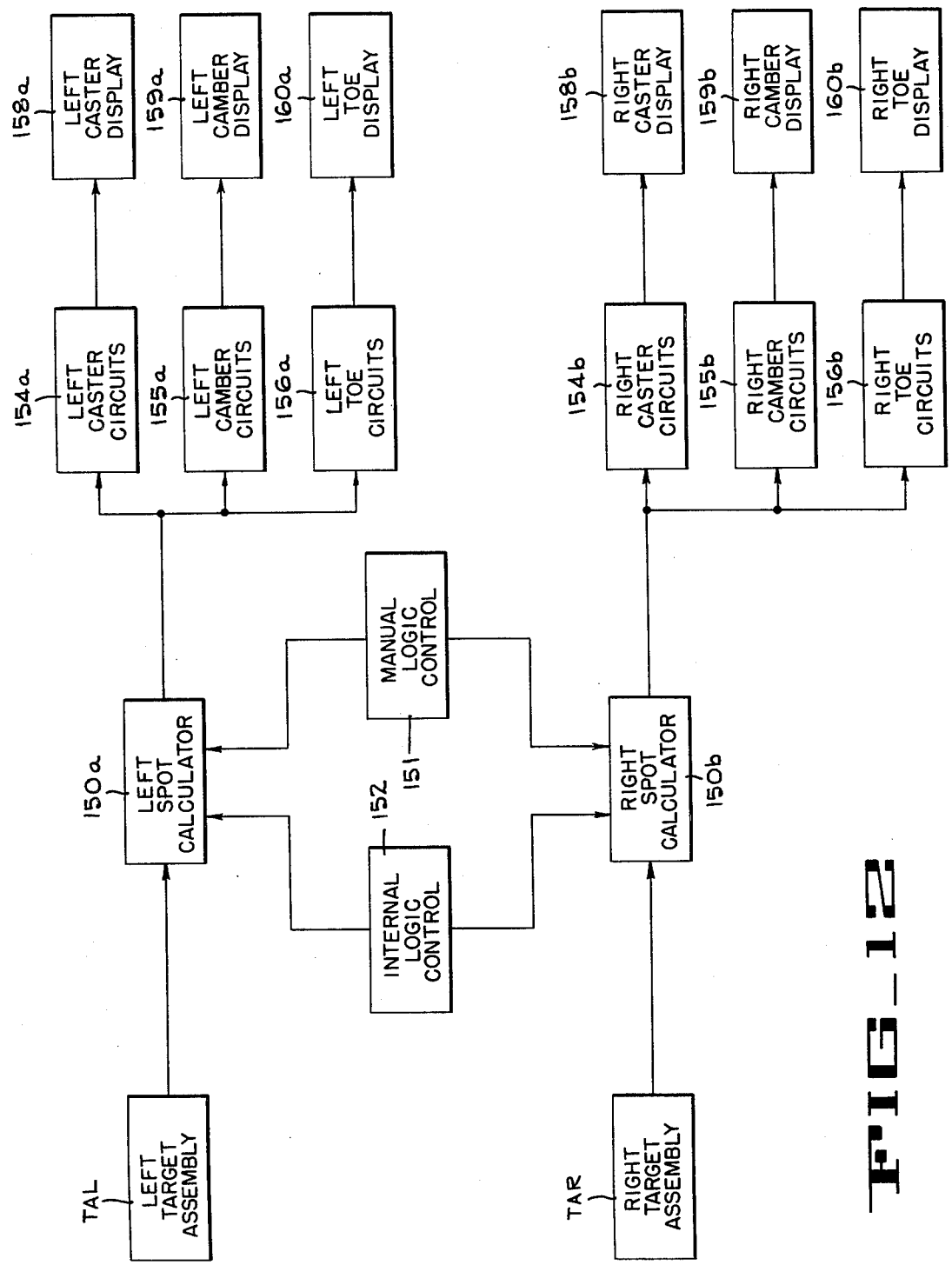
FIG_12

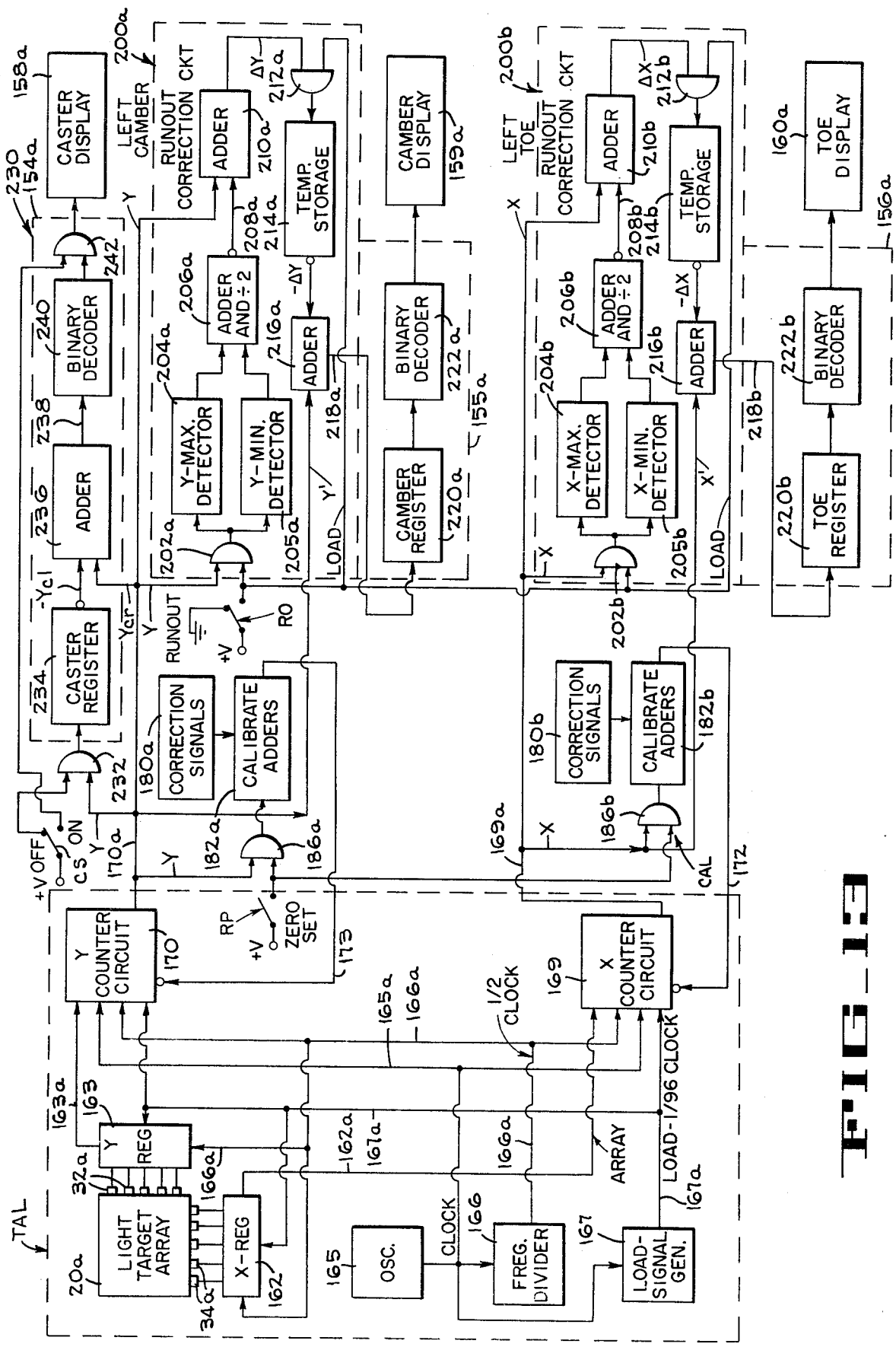
FIG_13

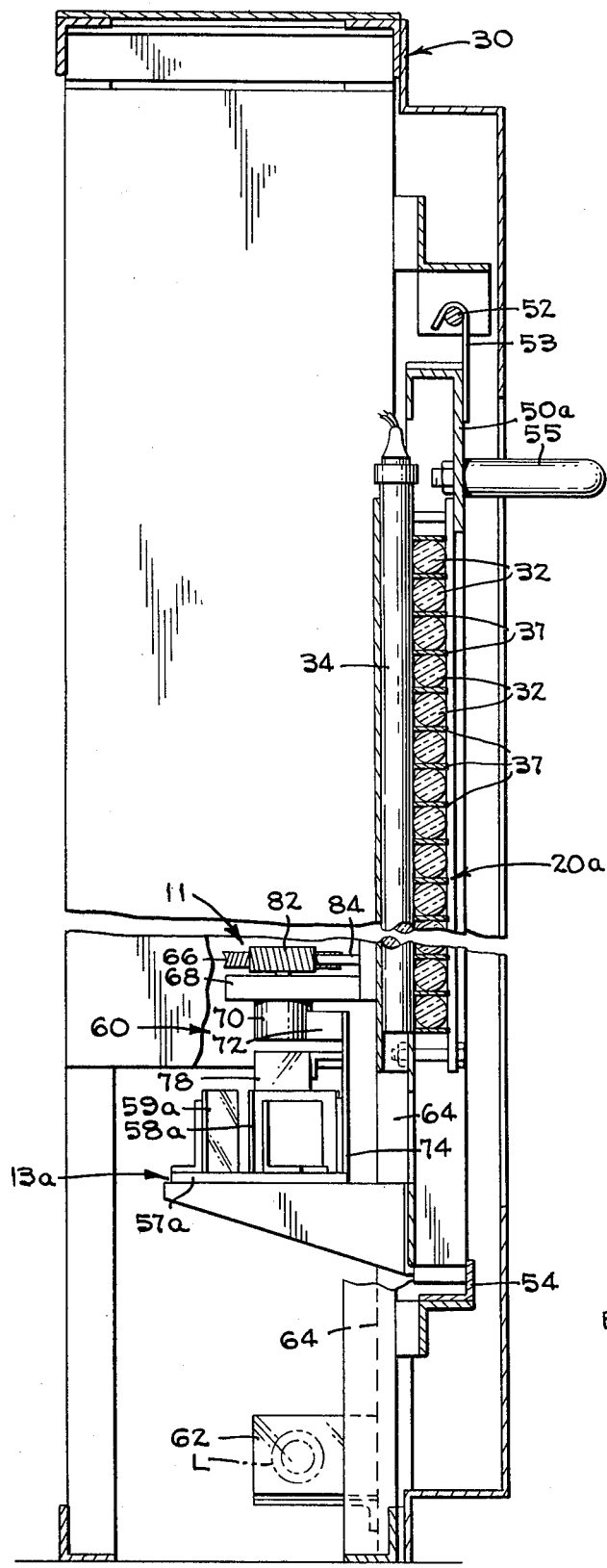
FIG_14
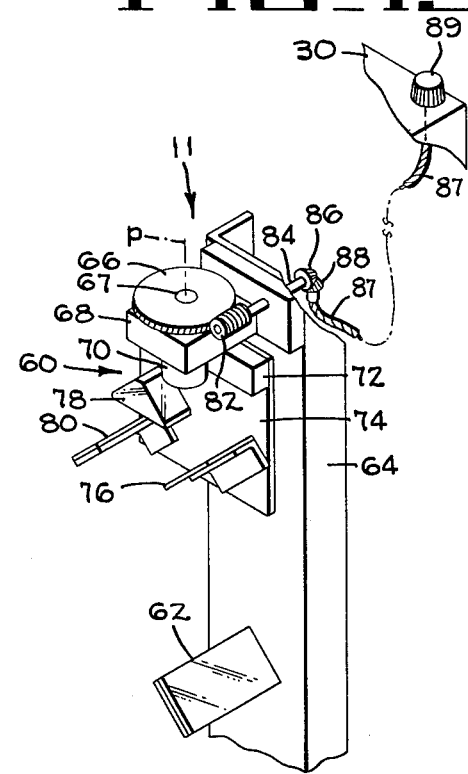
FIG_15
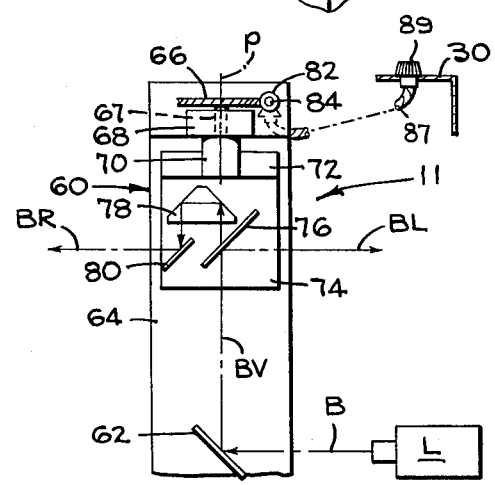
FIG_16

APPARATUS FOR MEASURING WHEEL ALIGNMENT OF MOTOR VEHICLES

BACKGROUND OF THE INVENTION

1. Field of the Invention

This invention pertains to apparatus for measuring wheel alignment parameters of motor vehicles, and more particularly it pertains to apparatus which measures the deflection of a light beam which is reflected from a mirror or target placed upon a wheel of the vehicle.

2. Description of the Prior Art

In order to provide good performance from the steering apparatus of a motor vehicle and to promote tire life it is necessary that the front end of the vehicle be correctly aligned. To insure that the front end is correctly aligned the accurate measurement and adjustment of relatively small angles is necessary. Such measurements can and have been made with fairly simple instruments heretofore during a conventional front end or wheel alignment process. However, use of such prior art instruments is generally slow and time consuming if proper accuracy is to be obtained. In order to be effective, a wheel alignment machine should be both fast and accurate and it should be convenient for the average mechanic to use both for measuring and adjusting the alignment parameters.

In one type of prior art device, as shown in U.S. Pat. No. 3,758,213 to MacPherson et al and U.S. Pat. No. 3,630,623 to Schirmer, a light projector, mounted at the side of the vehicle, directs a beam of light to a mirror mounted on the wheel being measured. The beam is reflected from the wheel mirror to a viewing screen mounted adjacent to the light projector to indicate the alignment of the wheel. These prior art devices must be carefully aligned with the vehicle by moving either the vehicle or the alignment device in order to provide accurate measurements of the wheel alignment parameters.

In another type of prior art device, as shown in U.S. Pat. No. 2,700,319 to Carr, a source of light is mounted at one end of the vehicle parking space. A pair of narrow beams of light are projected across the end of the parking space where the beams are directed toward the wheels being measured by a pair of flat mirrors located near the front corners of the vehicle. The vehicle must be moved into a predetermined position in the parking space and accurately positioned in relation to the mirrors. This requires a special guide rack or excessive labor on the part of the operator. Any stress on the mirror supports may cause movement of the mirrors causing movement of the beams of light and inaccurate readings. Also, small inaccuracies in positioning the vehicle in relation to the mirrors can cause inaccuracies in the alignment of the wheels on the vehicle. Alternate methods are available which align the optical system with the vehicle by using a large movable mirror which is moved to direct the light beam to the wheel of the vehicle. However, this approach also requires several steps, and the accurate positioning of a relatively large mirror is a time consuming operation.

SUMMARY OF THE INVENTION

The present invention provides apparatus for fast and accurate measurement of wheel alignment angles of motor vehicles. The apparatus can be quickly and accurately aligned with a vehicle which is parked in an assigned parking space but it is not necessary that any special care be used in parking and carefully aligning the vehicle. A source develops a narrow beam of light, and a primary beam is provided which is directed by a primary mirror set to a reflector mirror mounted on the wheel being aligned. The beam of light is returned from the wheel mirror to a target which determines the position of the reflected beam relative to a reference point to thereby indicate the alignment angle of the wheel. The mirror set has reflecting surfaces which provide a constant net angle of 90° between the incident beam of light and the reflected beam (when viewed from above), and this angle remains constant for a wide range of angles of incident light. Small movements of the mirror set does not affect the accuracy of the measurements. Also, the primary beam can be readily adjusted by rotating the beam at the beam source.

The advantages of the invention will become apparent from the following description when taken in connection with the accompanying drawings.

BRIEF DESCRIPTION OF THE DRAWINGS

FIG. 1 is a diagrammatic plan view of the preferred embodiment of the invention showing the arrangement of the apparatus in the measurement of the wheel alignment parameters of a vehicle.

FIG. 2 is a perspective view of the apparatus of FIG. 1 further illustrating a vehicle being tested.

FIG. 2A is a horizontal section through a front wheel mirror mounting.

FIG. 2B is a fragmentary front view of a front wheel mirror.

FIG. 3 is a diagrammatic plan view of the apparatus of the invention particularly showing how the light beams can be rotated while maintaining relative angles of 90° for aligning the beams with the vehicle. The light source position is shown schematically and the relay mirror assemblies are omitted for clarity.

FIG. 3A is a diagram like FIG. 3 with the relay mirrors in place and with the light beams adjusted parallel to an ideally parked vehicle, the longitudinal axis of which corresponds to the longitudinal axis of the apparatus.

FIG. 3B is a highly schematic diagram showing the principles of aligning the light beams with a vehicle which is offset from and at an angle to the axis of the apparatus.

FIG 4 is a further diagrammatic plan view of the invention particularly showing the apparatus as it is used for determining the zero reference points or zero set positions of the system on the front targets.

FIG. 5 is an enlarged isometric view of the zero set prism employed in FIG. 4.

FIGS. 6-8 are diagrammatic views illustrating, respectively, the camber, caster and toe angles which are measured by the apparatus of the present invention.

FIG. 9 is a fragmentary diagrammatic view illustrating various measurement points on a front target of the present invention.

FIG. 10 is a partial front elevation showing the glass rod grid forming a front target.

FIG. 11 is a diagrammatic plan view illustrating another embodiment of the present invention.

FIGS. 12 and 13 are schematic diagrams showing the electronic circuitry which can be used to calculate and display the wheel alignment angles which are measured with the apparatus of the present invention.

FIG. 14 is an enlarged vertical section through the panel assembly taken along line 14—14 of FIG. 2.

FIG. 15 is an isometric rear detail view of the optical mechanism used to control the direction of the source beam.

FIG. 16 is a rear view of the mechanism shown in FIG. 15.

DESCRIPTION OF THE PREFERRED EMBODIMENT

Referring now more particularly to the drawings, FIG. 1 is a diagrammatic plan view of the apparatus of the present invention for measuring wheel alignment angles of motor vehicles. An angularly adjustable light source is indicated generally at 11. The source is located at or near the center line and forwardly of a motor vehicle 18 and rotates about an optical axis p on a longitudinal reference axis A—A which ideally corresponds with the longitudinal axis V—V of the vehicle. The source 11 provides oppositely directed, co-axial, or at least parallel, narrow primary beams of light BL and BR projecting laterally with respect to the vehicle. Each one of these beams is projected to a corresponding one of a pair of laterally shiftable front primary roof mirror sets 13a and 13b having mirrors disposed at 45° to one another which deflects the beam through a total angle of 270° to form a reflected beam BL' or BR' which has an external angle at 90° to the primary beams BL or BR. The beams BL' and BR' are reflected rearwardly to laterally adjustable and 90° rotatable relay roof mirror sets 14a, 14b located adjacent the front wheels 17a, 17b of the vehicle. Each relay mirror set 14a, 14b also includes a pair of roof mirrors disposed at 45° relative to one another which deflect the beam BL' or BR' through a total angle of 270° (or an external angle of 90°) and a 180° zero set or reference point reflecting prism to be described in detail presently.

In FIG. 1 the relay mirror sets 14a, 14b have been rotated to a position wherein light received thereby is reflected by their roof mirrors to their respective wheel mirrors 16a, 16b. For example, the left front roof mirror set 13a reflects the left lateral beam BL from the source through a total angle of 270°, which changes the beam direction 90° directing a beam BL' to the left relay mirror set 14a. The left mirror set 14a changes the direction of beam BL' 90°, causing the beam BL' to impinge on the left wheel mirror 16a pendulously mounted on the front left wheel 17a in a manner to be described. Light reflected from the left wheel mirror 16a is reflected 270° by the left roof mirror relay mirror set 14a and directed forwardly as beam BL" to a front target 20a located just in front of and shiftable with the front roof mirror set 13a as will be described presently.

In a similar manner, the right lateral beam BR from source 11 is directed by a right front primary roof mirror set 13b, a right relay roof mirror set 14b and by a right wheel-mounted mirror 16b to a right front target 20b.

FIGS. 2A and 2B show details of the mounting of the left front wheel mirror 16a, the right front wheel mirror 16b being mounted in the same manner.

Wheel Mirrors

The wheel mirrors 16a, 16b are of the same construction but are mounted on their respective front wheels facing in opposite directions, hence the individual reference characters for components of the mirrors of the left wheel mirror 16a will also be used, when applicable, to the corresponding components of the right wheel mirror 16b, and only the left wheel mirror 16a will be described in detail.

The wheel mirror 16a is mounted on the rim of the left front wheel 17a by a fixture F including a rim clamp and a mirror mounting bracket such as that shown in Holmes U.S. Pat. No. 2,457,502 issued July 5, 1929 and in the co-pending application of Andrew K. Chang entitled "On The Fly Run-Out Correction For Vehicle Wheel Alignment", Ser. No. 863,196, filed Dec. 22, 1977, Notice of Allowance issued on Sept. 24, 1979, and now U.S. Pat. No. 4,192,074 incorporated herein by reference.

Referring to FIGS. 2A, 2B the fixture F includes a lower clamp 16d having a projecting lug 16e for clamping against the rim flange of the left front wheel 17a. The lower clamp mounts parallel track rods 16f which connect to a conventional upper rim clamp (not shown) but which appears in the aforesaid patent and patent application. Adjustably slidable on the rods 16f is a mirror mounting bracket 16g having a horizontally projecting stub shaft 16h with an axis Z—Z, which theoretically should be parallel to the axis S (FIG. 9) of the corresponding front wheel spindle but which may not be exactly parallel, causing the phenomenon known as "run-out", as will be briefly described presently and which is discussed in detail in the aforesaid application.

The left front wheel mirror assembly 16a includes three mirrors, a flat front or main mirror 16M and flat angled wing mirrors 16L, 16R. These mirrors are mounted (usually by adjustment screw structure not shown) in an angled frame 16c having a rearwardly projecting hub 16j. The hub 16j is freely rotatably mounted on the bracket stub shaft 16h by anti-friction bearings and the center of gravity cg (FIG. 2B) of the mirror assembly is below the pivot axis Z—Z so that the mirror assembly is pendulously mounted and hangs down vertically from its mounting axis. The reflecting surface of the mirror 16M is vertically disposed relative to its pivot axis Z—Z and the reflecting surfaces of the wing mirrors 16L, 16R are at an angle of 15° to the mirror 16M. The lines forming the intersections of the planes of the reflecting surfaces of the wing mirrors 16L, 16R and the mirror 16M are vertical because of the pendulous mounting of the mirror assembly.

The light source 11 is provided with means (to be described in greater detail hereinafter) to effectively rotate the parallel lateral primary beams BL and BR about the "virtual" vertical axis p (FIG. 1) so that the reflected beams BL' and BR' from the front roof mirror sets 13a, 13b may be readily adjusted to project in a direction parallel to the sides of the vehicle 18, and these beams remain parallel to one another during such adjustment. As mentioned, and as will be described in detail presently, the front primary roof mirror sets 13a, 13b and the relay roof mirror and prism sets 14a and 14b may all be independently moved laterally with respect to the vehicle 18 to adjust for different widths of vehicles and for different parking positions and angles of the vehicles, such adjustments being performed in conjunction with a compensating rotation of the light source 11. In this connection, and as will be described presently, the system also includes left and right rear targets 25a, 25b (FIGS. 1 and 3-3B) each of which is mounted on a movable stand 26 for positioning the rear targets against the rear vehicle wheels 17c, 17d during the aforesaid alignment of the reflected beams BL' and BR' with the vehicle.

Front Targets, Mirrors and Panel Assembly

Details of the apparatus for adjusting the positions of the primary mirror sets, the targets and the light beams may be seen by referring to FIGS. 2, 14, 15 and 16. The front roof mirror sets 13a and 13b, the light source 11, the targets 20a and 20b and the left and right sets of camber, caster and toe display boards DL and DR are mounted in a large cabinet 30 (FIGS. 2 and 14) that extends across the front end of the vehicle 18.

In the embodiment shown, the front targets 20a (FIG. 14) and 20b comprise abutting horizontal and vertical arrays of internal light reflection glass rods or "light pipes" 32, 34, the rods each having a phototransistor unit 32a, 34a (FIG. 10) at one end thereof for producing an electric signal when a spot on a front rod 32 intercepts a beam of light and when that light is transmitted through a front rod to a rear rod 34, as described in detail in the co-pending United States patent application of Julius J. Muray et al entitled "Light Target Array", filed on June 8, 1978, Ser. No. 913,766, now abandoned, and incorporated herein by reference. The light pipes 32, 34 are separated by opaque shims 37 in order to assist in confining an incident light beam within the pipes.

The left front roof mirror set 13a and the left target array 20a are supported (FIG. 14) by a vertical panel 50a the upper end of which is slidably mounted on an overhead track rod 52 by a pair of hangers 53, the lower end being guided in a track 54 (FIG. 14). A handle 55 attached to the front face of the panel 50a facilitates sliding of the panel mirror set and target along its rod 52 in a direction parallel to the front of the cabinet 30. The panel 50a mounts a horizontal platform 57a which supports the roof mirrors 58a, 59a which have an included angle of 45° and which make up the left front roof mirror set 13a (FIGS. 1, 3 and 3A). Panel 50a is mounted near the left end of the cabinet (as viewed from the front), and a similar panel 50b is slidably mounted near the right end of the cabinet 30, as shown in FIG. 2, which panel mounts mirrors 58b, 59b of the right front roof mirror set 13b.

Split Beam Source

The adjustable light source 11 (FIGS. 15 and 16) comprises a split beam producing mechanism 60, a laser beam source L, and a fixed 45° mirror 62 mounted on a post 64 at the center of the main cabinet 30. The split beam optical system 60, which is used to angularly adjust the direction of the primary beams BL, BR from the laser beam source L, includes a worm gear 66 connected to one end of a vertical shaft 67 which is journaled in a horizontal mounting block 68 projecting from the vertically extending post 64 in the cabinet 30 (the lower end of post 64 appearing in FIG. 14) and which rotates about the aforesaid "vertical" optical pivot point "p" (FIG. 1). A collar 70 is secured to the lower end of the shaft 67 so that the collar is supported by and rotates with the shaft 67. Secured to the collar 70 is a flat cross bar 72 which supports a depending panel 74 which thereby rotates with the shaft 67. Mounted on the panel 74 are a 45° half-silvered mirror 76, a 90° reflecting prism 78 which deflects light beams through an angle of 180°, and a 45° silvered mirror 80. A worm 82 secured to one end of a shaft 84 meshes with a worm gear 66. Mounted at the other end of the shaft 84 is a bevel gear 86 which meshes with a second bevel gear 88. The bevel gear 88 is connected to one end of a flexible shaft 87 with a knob 89 being connected to the other end of the flexible shaft. The knob 89 is fixed at one end of the cabinet 30 (as shown in FIG. 2) for easy access to the operator.

A laser beam B (FIG. 16) emanating from the laser beam source L is reflected upwardly from the fixed 45° mirror 62 as beam BV where it is partially reflected by the half-silvered mirror 76, forming a primary beam BL reflected to the right as shown in FIG. 16 (the beam directions being reversed in FIG. 16, which is a view from the rear of the cabinet 30). Another portion of the beam BV passes directly through the half-silvered mirror 76, strikes the 90° reflecting surfaces of the prism 78 and is thus turned 180° and directed to the 45° mirror 80 which forms a primary beam BR reflected to the left as shown in FIG. 16. As mentioned, the primary beams BL and BR are at least parallel and preferably they are substantially co-axial. The laser source L is positioned and oriented so that the vertical beam portion BV (FIG. 16) of the beam B is directed by the mirror 62 along the rotary axis p of the beam splitter supporting shaft 67 so that the orientation of mirrors 76 and 80 and prisms 78 directly determine the direction of the lateral primary beams BL, BR relative to the front roof mirror sets 13a, 13b.

The front target arrays 20, 20a are mounted in the cabinet 30 so that they slide (FIG. 3A) in planes that are generally parallel to the primary beams BL, BR when the light source 11 is positioned at substantially the mid-position of its swing excursions relative to the longitudinal axis A—A of the system. For example, when the beam splitter panel 74 is in its mid-position, parallel to the plane of the front face of post 64, the lateral primary beam BR reflected from the mirror 80 (FIG. 16) is directed to the right (FIG. 1) in a plane parallel to that of the right front target array 20b. The oppositely directed lateral primary beam BL is reflected from the surface of the mirror 76 in a plane parallel to that of the left front target array 20a. When the knob 89 is rotated, the worm 82 causes the worm gear 66 to rotate and to swing the mirrors 76 and 80 and the prism 78 about the axis p of shaft 67 (FIG. 16). For example, as shown schematically in FIG. 1, when the worm gear 66 rotates in a counterclockwise direction, the beam splitter panel 74 and the optical elements mounted thereon cause the left lateral primary beam BL reflected from the surface of the half-silvered mirror 76 (FIG. 16) to be rotated counterclockwise about the axis p as shown in dotted line in FIG. 1. The right lateral primary beam BR, reflected from the surface of mirror 80 also turns in a counterclockwise direction and through the same angle as the left primary beam BL, as shown by a dotted line in FIG. 1. The optical effect of rotating the lateral primary beams BL, BR in conjunction with the primary front roof mirror sets 13a, 13b is illustrated in FIG. 3, wherein the relay mirror sets 14a, 14b have been omitted for clarity. For example, one position of a left lateral primary beam BL is shown in solid lines. This beam, emanating from the light source indicated generally at 11, strikes the left front roof mirror 58a, is reflected to the opposed roof mirror 59a and is reflected from mirror 59a rearwardly forming a reflected, rearwardly directed beam BL'. The roof mirrors turn the incident beam through a total angle of 270° so that the primary beams BL and BL' are actually at a net angle of 90° to one another and can functionally be considered to emanate from a virtual origin p1. Rotation of the light source 11 to produce the lateral beams BL and BR shown in dot-dash lines changes the virtual 90° apex position from pl to pl' but the rearwardly directed beam BL' (now shown in dot-dash lines) remains at 90° to the incident primary beam BL, and the optical effect is one whereby the reflected beam BL' emanates from a new virtual position pl' which forms the apex of the net 90° angle with the incident beam BL shown in dot-dash lines. The same optical effect takes place at the right front mirror set 13b.

Stand and Relay Mirror Sets

Referring to FIGS. 1, 2 and 3A, before initiating the alignment procedures, the front wheels of the vehicle 18 are driven onto a stand S that mounts the relay mirror sets 14a, 14b. The relay mirror sets are identical except that the set 14a is oriented for mounting at the left side of the vehicle and the set 14b is oriented for mounting at the right side thereof. Only the set 14a will be described in detail.

The optics are mounted in a generally square, pivotally mounted box or housing 90 (FIGS. 2 and 3A), having a mounting floor 92 partially surrounded by a sidewall 94 which provides a window for the light beams during establishment of a zero or reference position on the front target 20a (as shown in FIG. 4) and during the wheel alignment procedure (as shown in FIGS. 1 and 2). The box 90 has a top cover 93 (FIG. 2). As seen in FIGS. 2 and 2A a relay mirror positioning feeler rod or gauge 95 is provided for touching the associated main front wheel mirror 16M (FIG. 3A) so that the relay mirror sets may be positioned equidistant from their respective front wheels. Supported on the floor 92 are companion roof mirrors 96a, 98a which have an included angle of 45° and hence turn a light beam through a total angle of 270° producing a net reflection angle of 90° (FIG. 1) as do the roof mirrors 58a, 59a of the front mirror set 13a, as previously described. Mounted on the floor 92 is a 90° reference prism 100a which reflects an incident beam of light through an angle of 180° back to the front target. In this connection, referring to FIGS. 4 and 5, the prism 100a, for example, has rear 90° light reflecting surfaces 102, 104 and the front, transparent surface of the prism is masked at 106, 107 and 108 to provide light windows 110, 112. An incident beam of light such as the light beam BL' entering the window 110 is reflected across the 90° reflected surfaces 102, 104 and emerges as beam BL" parallel to the incident beam BL'.

Referring back to the relay mirror sets and the stand S, each relay mirror optics box 90 is pivotally mounted at 120 on an adjustable post assembly indicated generally at 122 in FIG. 2. The pivot axis 120 is parallel to the optical pivot axis p (FIGS. 1 and 3), but the roof mirrors and prism of the relay mirror set are tilted upwardly by a small angle so that the beams BL' and BR' can pass through the windows 21a, 21b below the target arrays 20a, 20b (FIG. 2) and the returned beams BL", BR" will strike the target arrays. The post assembly includes a base 124 that is slidable along tracks 126 which are substantially parallel to the tracks 52 for the mirror sets 13a, 13b. The base 124 can be locked into its adjusted position by any quick acting locking device indicated at 125 in FIG. 2.

In order to provide for vertical adjustment of the relay mirror sets 14a, 14b, each post assembly 122 has a sleeve 128 on the base 124 receiving a telescoping post 130, the upper end of which mounts a mirror box supporting platform 132. The post 130 can be locked to the sleeve 128 by any convenient latch unit 134. Platform 132 mounts the pivot 120 (FIG. 3A) for the relay mirror box 90 so that the left relay mirror set 14a pivots about a vertical axis 120a illustrated for the left hand set in FIG. 2. The right relay mirror set 14b is of the same construction except that it mounts roof mirrors 96b, 98b and 180° prism 100b. The box 90 containing the mirrors and prism can be adjusted to incline the optics relative to the pivoted platform 132 by any conventional structure such as leveling screws, not shown. In inclining the optics, the housing 90 should be rotated about an axis which is perpendicular to a line bisecting the mirrors 96, 98 in order to prevent cross talk between the toe and camber readings.

Optical Paths

The optical paths of various light beams are shown during the alignment procedure for toe and camber in FIGS. 1, 2 and 3. Emanating from the light source 11 are left and right lateral primary beams BL, BR. As seen in FIG. 1, these beams strike the front roof mirror sets 13a, 13b and are turned by the roof mirrors 58a, 59a, for example, through a total angle of 270° so that a reflected beam BL' is directed rearwardly (at a net angle of 90° to primary beam BL) to the left relay mirror set 14a. As previously described in connection with FIG. 3, the primary beams BL, BR and the reflected beams BL', BR' remain at a net angle of 90° to one another as the angles of incidence of beams BL, BR are changed. As mentioned, the primary beams BL and BR are mutually parallel and preferably they are substantially coaxial. The laser source L is positioned and oriented so that the vertical portion BV (FIG. 16) of the original source beam B is directed by the mirror 62 along the rotary axis p of the beam splitter supporting shaft 67 so that the orientations of mirrors 76 and 80 and prism 78 directly determine the directions of the lateral primary beams BL, BR. The rearwardly reflected left beam BL' is reflected through a total angle of 270° by the left relay mirror set 14a and projected to the reflecting front surface of the main mirror 16M of the left wheel mirror 16a. As mentioned, the optical effect of the relay mirror sets 14a, 14b in the position of FIG. 1 is to deflect the incident beams BL', BR' by a net angle 90° to the associated wheel mirrors 16a, 16b.

In aligning the vehicle, the wheels 17a, 17b are turned to a straight ahead position so that each main wheel mirror surface 16M is substantially parallel to the longitudinal axis V—V of the vehicle. In FIGS. 1 and 3A, which represent idealized conditions, the vehicle axis V—V corresponds with the longitudinal axis A—A of the optical system, which passes through the beam splitter pivot axis p.

Referring to the left hand side of FIG. 1, the incident beam BL' from the left relay mirror set 14a is reflected back from the main wheel mirror surface 16M, is again reflected through a total angle of 270° by the left relay mirror set 14a as forwardly directed beam BL" (shown in dashed lines), and impinges on the left front target 20a. As will be seen in connection with FIG. 9, the position of the interception of beam BL" on the left front target 20a is measured in X and Y coordinates as measured toe and camber of the left front wheel 17a at the time such measurements are taken. A corresponding optical path for the right beams BR' and BR" is provided at the right hand side of the vehicle with the right relay mirror set 14b being in the position shown in FIG. 1.

Alignment With Vehicle

Before making the wheel alignment measurements just described, it is essential that the reflected beams BL' and BR' be parallel to the longitudinal axis V—V of the vehicle. FIG. 3A shows the ideal conditions of vehicle placement, wherein the longitudinal axis of the vehicle coincides with the longitudinal axis A—A of the optical system passing through the beam splitter pivot axis p. Although the alignment shown is not usually achieved, FIG. 3A illustrates the ideal condition and the principles of initial vehicle-beam alignment. The rear targets 25a, 25b are positioned against the rear wheels 17c, 17d, and the light source 11 has been pivoted about axis p by the knob 89 (FIG. 2) so that the front lateral beams BL, BR are perpendicular to the system axis A—A, although such perpendicularity with the system axis is not normally achieved (as will be made clear presently). The relay mirror sets 14a, 14b are turned so that their windows face the front, and the housings 90 are positioned along their tracks 126 until the feeler gauge 95 on each housing touches the main wheel mirror surface 16M on the left or right wheel mirrors 16a, 16b so that the corners (FIG. 3A) of the housing 90 serve as beam position indicating means. The front roof mirror sets 13a, 13b (and associated targets 20a, 20b) have been shifted along their respective tracks 52 until rearwardly directed reflected beams BL', BR' just touch the inner corners of the associated housings 90 of the relay mirror sets and continue rearwardly to the rear targets 25a, 25b. If the rearwardly directed light beams are parallel to the vehicle axis V—V of a perfectly aligned vehicle, as in FIG. 3A, the readings RTL, RTR on the rear targets 25a, 25b will be equal and the alignment procedure can continue.

FIG. 3B illustrates a feature of the present invention wherein the alignment beams BL, BR are rapidly adjusted so that it is not necessary that the vehicle be positioned on the stands so that its longitudinal axis V—V is either parallel with or coincident with the longitudinal axis A—A of the alignment system or that the front wheel mirrors 16a, 16b are exactly centered on the stand S. Usually guide lines (not shown) are painted on the floor and stand S to permit approximate orientation of the vehicle quickly; the misorientation of the vehicle in FIG. 3B is greatly exaggerated for purposes of explanation.

The diagram of FIG. 3B has adopted a simplifying convention which was explained in connection with FIG. 3. For example, the left lateral primary beam BL (solid lines) emanating from the light source 11 is deflected by the left front mirror set 13a through a total angle of 270° (this being the equivalent of turning the beam through a net angle of 90° from about a "virtual" apex point pl) to form the rearwardly directed beam BL'. The same geometrical considerations apply to the primary beam BR in that the beams BR and BR' remain at an angle of 90° with the beam BR' appearing to emerge from a virtual apex point pr. In the interests of simplicity only the virtual apex points pl and pr appear in the alignment diagram of FIG. 3B, the 270° deflections by mirror sets 13a and 13b being eliminated.

After sliding the relay mirrors 14a, 14b (turned toward the front) until their feeler gauges 95 touch their respective front wheel mirrors 16a, 16b, the initial alignment procedure of FIG. 3B includes two basic steps. The solid line beams BL, BR originating from the light source 11 represent the beam conditions during the first step. As mentioned, these beams are not necessarily perpendicular to the optical axis A—A of the apparatus but are so illustrated in FIG. 3B. The beams make a 90° turn at virtual points pl, pr and continue as reflected beams BL', BR' to the rear targets 25a, 25b, the stands of which (not shown) have been positioned to bring the targets into engagement with their respective rear wheels 17c, 17d. The left front mirror set 13a (and associated target 20a) is then shifted along its track 52 (not shown) until the left rearwardly reflected beam B1' just touches the inside corner of the wall 94 of the left relay set housing 90. The left reflected beam BL' will continue and will strike the left rear target 25a at a rear target position RTL, the value of which is arbitrarily assigned as "3.3". The right front mirror set 13b is then shifted (without turning the light source 11) until the right rearwardly reflected beam BR' (solid lines) just touches the inside corner of the housing 90 of the left relay mirror set 14b. The reflected right beam BR' will strike the right rear target 25b at a rear target position RTR, arbitrarily assigned as "18.7".

The operator now computes the average of the two readings RTL and RTR at the rear targets which, in this case, happens to be an average ("av") of 11. While insuring that the flags 95 of the relay mirrors 14a, 14b remain against their respective front wheel mirrors 16a, 16b, the operator now proceeds to the second step of the alignment procedure which comprises the rotation of the light source 11 about axis p using knob 89 (FIG. 2) and the shifting of the left front roof mirror set 13a until the left reflected beam BL' (shown in dashed lines) again touches the corner of the housing 90 for the left relay mirror set 14a. The aforesaid beam rotation and mirror shifting steps are coordinated so that the left reflected beam BL' strikes the left rear target 25a at the aforesaid computed average point ("av") of 11. The operator (without turning the light source 11) now shifts the right front roof mirror set 13b along its track 52 until the right reflected beam BR' (dashed lines) just touches the same corner of housing 90 for right relay mirror set 14b. If the aforesaid work is done carefully the reflected right beam BR' will strike the right rear target 25b at the computed average reading ("av") of 11, and it can now be assumed that the rearwardly directed parallel reflected beams BL' and BR' are parallel with the longitudinal axis V—V of the vehicle.

The vehicle misalignment of FIG. 3B is grossly exaggerated for purposes of explanation, as explained hereinbefore. In practice, the lateral offset and angular deviation of the vehicle axis V—V from the optical axis A—A will be small, the angular offset usually being no more than a few degrees. The flags 95 will engage the front wheel mirrors 16a, 16b at substantially centralized positions, and the amounts of lateral shift required for the front roof mirror sets 13a, 13b will be substantially equal.

The 270 degree primary roof mirror sets 13a, 13b keep the reflected light beams BL', BR' parallel to the sides of the vehicle even when the mirror sets are somewhat rotated or twisted due to distortion of the support structure. In prior art apparatus which used a simple 45° mirror at each of the front corner positions 13 and 14, it was necessary to mount the mirrors on heavy, rigid supports because any turning of the simple mirrors would swing the beams and cause inaccuracies in the readings on the target or indicating devices. In the apparatus of the present invention the roof mirror sets 13a, 13b and 14a, 14b may each be rotated through a substantial angle of several degrees (so long as the beams continue to appropriately strike the various mirrors) without change in the net 90° angles through which the beams are deflected. This permits the support structures in the present invention to be simpler and less expensive than those of the prior art apparatus.

Wheel Alignment Procedure

Three of the basic front wheel alignment angles that are commonly measured are camber, caster, and toe which are illustrated in FIGS. 6, 7, and 8 respectively and which appear in the cabinet displays DL and DR for the left and right front wheels (FIG. 2). As shown in FIG. 6, camber is the angle between the plane of the wheel and the vertical. Correct camber adjustment should maintain the tire tread flat on the road surface under normal driving conditions and result in even tire wear across the tread. Camber that exceeds vehicle specifications causes wear on the outside edges of the tire, and insufficient camber wears the inside edges. FIG. 6 illustrates positive camber, which is normal for most vehicles.

Caster, shown in FIG. 7, is the angle between the steering axis Sa—Sa of the wheel and the vertical axis v—v as seen from the side of the vehicle. Caster improves the stability and the handling of the vehicle. Positive caster offsets the steering axis Sa—Sa from the vertical axis v—v such that a line representing an extension of the steering axis intersects the road in front of the tire contact point. As a consequence, the road forces exert a moment which urges the wheel to the straight-ahead position.

Individual toe is defined as the angle between the front wheels and the longitudinal axis or center line V—V of the vehicle, as shown in FIG. 8. Toe affects tire wear. Excessive toe in or excessive toe out gives a component of velocity perpendicular to the plane of the wheel. Since the tire is not free to roll in this direction, the effect is a sliding of the tire relative to the road which results in a "feathering" wear of the tire tread.

Reference Point Determination

With the vehicle 18 in position and all wheels on the floor, and with the beams BL', BR' aligned with the vehicle using the rear targets, and with the relay mirror sets 14a, 14b still aligned with their windows to the front, the front targets are shifted to receive the beams BL" and BR" from the prisms 100a, 100b, as shown in FIG. 4. The location of the beams BL" and BR" on the targets then provides the reference points to which the subsequent toe and camber measurements are referenced. The beams reflected from the individual prisms are offset from the incident beams by previously measured distances indicated as prism offset ("pro"), and these offsets must be accounted for in determining the true zero reference points on the targets 20a, 20b, as shown in FIG. 9. A reference or zero position switch RP (FIG. 13) is closed, providing the electronic circuitry with a reference or zero point which is offset from the prism signal reference point rp on each front target 20a, 20b (FIG. 9) by the prism offset distance, "pro"—the example of FIG. 9 being for left target 20a.

Toe and Camber Measurements

The measurement of front wheel toe and camber requires a correction for "run-out error" resulting from the fact that the wheel mirrors 6a, 16b are not always in planes perpendicular to the spindle axes of the front wheels. The principles, measurement and corrections for run-out are explained in detail in the aforesaid copending U.S. patent application of Andrew K. Chang, Ser. No. 863,196. The aforesaid application discloses the use of a pendulously mounted wheel mirror for the measurement of toe and an inclinometer for the measurement of camber. Run-out is determined "on the fly", and the wheels can be set down at any position after rotation through an angle of 360° or more. However, the run-out error correction principles employed in the Chang application are the same as those of the present invention wherein both toe and camber are measured by reflections from the same mirror surface at each wheel and the targets 20a, 20b provide both measured toe and measured camber angle signals which are corrected for run-out in accordance with the principles of the Chang application and displayed as true toe and camber in the panel DL, DR of FIG. 2.

In determining the run-out corrections, the front of the vehicle is raised so that the wheels may be rotated (normally, one wheel being raised at a time). The relay mirrors 14a, 14b are turned to the sides, as in FIGS. 1 and 2, and a "start" or "run-out" switch RO (FIG. 13) is shifted from the position of FIG. 13. The front wheels are each turned at least 360° after which the start switch is returned to the position of FIG. 13 to store a computed run-out correction in toe and camber, as explained in the aforesaid Chang application. Wheel rotation during the run-out computations causes the reflected beams BL" or BR" to sweep around a circular path C, known as the run-out circle, having a center S that represents a projection of the associated wheel spindle axis. A typical run-out circle C is shown on the target 20a of FIG. 9 with the center point "S" being indicated as a spot where the beam would fall if the left wheel mirror 16M were mounted exactly perpendicular to the associated wheel spindle. After the wheels have been rotated at least 360° rotation is stopped, and the run-out switch RO is returned to the position of FIG. 13, thereby storing the run-out errors or corrections, as previously mentioned. Referring to FIG. 9, it is assumed that when the wheel is stopped, the beam from the wheel mirror 16a intercepts the target 20a at point X, Y (measured readings) and the run-out errors (corrections) in toe and camber are, therefore, $\Delta X$ and $\Delta Y$ (to be computed).

When the wheels are subsequently set down without further rotation, new measured toe and camber readings will be provided; however, the computed run-out errors $\Delta X$, $\Delta Y$ remain the same. Thus, these values are added or subtracted from the new measured values to provide true toe and camber readings corrected for run-out. As explained in the aforesaid Chang application and with reference to FIG. 9, toe and camber run-out errors are computed as follows:

Run-out error in Toe, $\Delta X = X - (X \max + X \min)/2$

Run-out error in Camber, $\Delta Y = Y - (Y \max + Y \min)/2$

Caster

When the front wheels 17a, 17b are mounted to provide a caster angle, as shown in FIG. 7, steering of the wheels to the right or left has the effect of slightly changing the camber angle (illustrated in FIG. 6). This effect is employed in the present invention to provide the means for measuring the caster angles of the front vehicle wheels 17a, 17b. When measuring the caster angle, the vehicle will have been aligned with the projected beams BL', BR', as previously described, and the relay mirror sets 14a, 14b will be turned so that their roof mirrors reflect light to the wheel mirrors 16a, 16b as shown in FIG. 1.

In measuring caster, the wing mirrors 16L, 16R (best seen in FIGS. 2A and 2B) mounted on the front wheel mirrors 16a, 16b are employed. It will be recalled that these wing mirrors, in the embodiment shown, are disposed at angles of 15° to the main mirror 16M employed in measuring toe and camber.

To measure caster angle, the front wheels are first turned about 15° right from their straight ahead position and then 15° left from their straight ahead position and readings on the associated targets 20a, 20b are taken at each wheel position. A convenient procedure for taking these readings is that of employing the zero toe reference for each wheel on the display panel of the cabinet 30 (FIG. 2). For example, in measuring caster of the left front wheel 17a and referring to the target array diagram of FIG. 9, the front wheels will be turned to the right until the toe display on the panel illustrates O toe—as indicated by the vertical dashed line Zt in FIG. 9. With the wheels turned to the right (for example) the reflected beam strikes the target at the point Ycr (FIG. 9) which lies on the aforesaid O toe reference line. At this time, the relay mirror set 14a is directing light to and receiving light from the wing mirror 16R of its associated wheel mirror 16a. The wheels are then turned 30° to the left until the beam reflected from the wing mirror 16L of the wheel mirror again falls on the zero toe reference line Zt (FIG. 9)—as indicated by a reading of zero on the toe display shown in FIG. 2. A new spot Ycl will now register on the target array vertically offset from the previously measured spot Ycr, as shown in the diagram of FIG. 9. It will be recalled that the wheel mirrors 16a, 16b are pendulously mounted on their mounting fixtures. The effect of this mirror mounting coupled with the fact that the wheels have been turned through a total angle of 30° (15° each side of the reference line) to make successive camber readings permits a trigonometric formula to be developed which will produce a constant K defining the relationship between the caster angle and the change in camber angle. Multiplication of this constant K by the difference in the two readings Ycr, Ycl will provide an indication of the caster angle of the front wheel. In practice, this operation is performed by the electronic circuitry to be described presently.

Modified Form of the Invention

FIG. 11 shows the modified form of the invention which has the advantage that the vehicle can be driven forwardly past the alignment measuring apparatus on completion of the alignment measuring procedure. Also, the modified form does not require the optical-mechanical beam splitting constructions shown in FIGS. 15 and 16. Optically, the modified form differs from that embodiment of the invention shown in FIGS. 1-3 in that the source beam is split into primary beams for reflection by the front roof mirror sets by one of the front roof mirror sets itself instead of by a separate beam splitter unit disposed between the front roof mirror sets.

In FIG. 11, the cabinet 30 (FIG. 2) is moved to one side of the apparatus as indicated. The laser source L' is also mounted to one side of the apparatus and can be pivoted about a vertical pivot axis p' functionally corresponding to the pivot axis p previously shown in FIG. 1 and other Figures. The other modifications in the FIG. 11 embodiment include the fact that in the left front roof mirror assembly 13a' the second roof mirror 58aa is half silvered in order that the primary beam B' emanating directly from the laser source L' can both pass through the mirror as well as being reflected thereby as in the previous embodiment of the invention. It will also be noted that the roof mirrors 59a, 58aa of the front roof mirror set 13a' are oriented in a direction that is 180° reversed from that of the previously described embodiment of the invention so that the half silvered mirror 58aa faces the pivoted laser source L'. Also, in the right front roof mirror set 13b' of the modified form of FIG. 11, the silvered roof mirror 58bb that receives the laser beam B' from the source L' preferably has a greater width than the corresponding mirror 58b of the FIG. 1 embodiment; this change is necessary to accommodate the increased excursion of the primary beam B' at the front roof mirror set 13b' resulting from the increased distance over which the laser beam B' can pivot during the initial alignment procedure. The remainder of the optical and mechanical elements and the alignment procedures of the embodiment of FIG. 11 are like those previously described in detail, and the description thereof need not be repeated.

Generalized Block Diagram

FIG. 12 is a generalized diagram of the overall electrical system for the display of left and right caster, camber and toe. The signals originate from left and right target assemblies TAL, TAR, the details of which will be explained in connection with FIG. 13. Referring only to the left wheel display portions of the circuit, the signals from TAL enter a left spot calculator 150a that also receives signals from the internal logic control 152 and the manual logic control 151. The left spot calculator sends signals to left caster circuits 154a, left camber circuits 155a, and left toe circuits 156a. Each of the latter circuits, respectively, sends signals to the left caster display 158a, the left camber display 159a, and the left toe display 160a. Corresponding circuits originating at the right target assembly TAR are also shown in FIG. 12 and are given the same reference numbers as those originating at the left target assembly except that they are followed by the letter "b".

Circuit Description

The overall circuit diagram of the system for one wheel (the left wheel) appears in the diagram of FIG. 13. The target array 20a, the light pipe sensors 32a, 34a and the associated components are disposed in the left target assembly, indicated by the dashed line box TAL. The reference numerals for all of the other units and the leads in the box TAL are like those of the aforesaid copending patent application of Julius J. Muray et al, Ser. No. 913,766 filed June 8, 1978, except that they are increased by 100. The aforesaid patent application is incorporated herein by reference, and, thus, the function of the target array 20a and the associated circuit TAL will be described only briefly.

When a beam such as BL" (FIG. 1) falls at the intersection of one of the vertical and one of the horizontal light pipes 32, 34 (FIG. 10) at least one (and possibly several) of the horizontal sensors 32a and at least one (and possibly several) of the vertical sensors 34a are energized to provide signals. Each of the energized sensors in the target array 20a provides a binary one which is loaded into a corresponding storage location in an X register 162 and a Y register 163. Each of the sensors which is not energized provides a binary zero for a corresponding one of the remaining storage locations in the X and Y registers. An oscillator 165 operates a frequency divider 166 and a 1/96 load signal generator 167, the latter developimg load signals which cause the binary ones and zeros from the sensors to be loaded into the X and Y registers. The ½ clock pulses from the frequency divider 166 cause these binary ones and zeros to be shifted serially from registers 162 and 163 into a corresponding X counter circuit 169 and a Y counter circuit 170.

The X counter circuit 169 and the Y counter circuit 170 each are operated so as to define the position of the activated light pipe (or the center position of a number of activated light pipes) with respect to an edge of the array. The specific means whereby this is accomplished is set forth in the aforementioned copending patent application of Julius J. Muray et al, which is incorporated hereby by reference. Thus, the Y counter provides a binary count which indicates the number of horizontal light pipes of target array 20a which are below the center of the light spot. In a similar manner, the X counter circuit produces a count which indicates a number of vertical light pipes to the left of the center of the light spot. Thus, the Y counter 170 contains a number which indicates the vertical position of the light spot on the target array 20a, and the X counter circuit 169 provides a number which indicates the horizontal position of the light spot on the target array.

The binary X or Y counter 169, 170 which may be used in the circuitry of FIG. 13 is the 8281 integrated circuit available from several manufacturers. A more complete description of the 8281 circuit may be found in the handbook "Integrated Circuits, Digital Linear, MOS", 1972, by Signetics Corporation, Sunnyvale, California.

Floating Zero

To move the zero location on the left target array 20a (for example) from one position of the array to a selected zero position, means are provided for moving the zero count in one direction or the other along the vertical and horizontal axes. Correction signals 180a, 180b are introduced into calibrate adders 182a, 182b, the output of which connects to the Y counter circuit 170 by line 173 and the X counter circuit 169 by line 172 to calibrate the counter circuits, i.e., locate the point at which the counting starts.

When the reference point or zero set switch RP is closed, the Y signals on line 170a from the Y counter circuit 170 enter AND gate 186a which now introduces the Y signals to the calibrate adders 182a for correction by the correction signals 180a. The Y signals are returned to the Y counter 170 by line 173 to provide the selected zero reference point for the counter. The same numbers with letter "b" appended are provided for the X counter calibration circuit shown in FIG. 13. The correction signals include the pre-measured prism offsets "pro" and are added to the initial X and Y counter circuit signals from 169, 170 to bring the reference points to a selected zero at the intersection of the Xo—Xo and Yo—Yo axes, as shown in FIG. 9 for the left target 20a.

Runout Corrections

As mentioned, it is necessary to find the center S of the runout circle C, as described in detail in the aforesaid patent application of Andrew K. Chang and as explained in connection with the diagram of FIG. 9, in order to correct for any lack of perpendicularity of the wheel mirror with the spindle of the wheel being checked. The value of the runout corrections in camber and toe are calculated by a pair of left and right runout correction circuits 200a, 200b (FIG. 13). These circuits are identical, and a detailed description of a suitable runout correction circuit is provided in the aforesaid Chang application, which is incorporated herein by reference.

Referring to the camber runout circuit 200a, for example, the runout calculation is initiated by closing the runout switch RO (FIG. 13) and rotating the wheel being checked through at least 360° in the system being described. Obviously, other runout correction systems can be employed without departing from the principles of the present invention. The camber circuit 200a includes an AND gate 202a which continuously receives wheel camber signals Y from the Y counter circuit 170 which signals activate Y-MAX and Y-MIN detectors 204a, 205a which include comparators and registers that provide the aforesaid maximum and minimum measurements, as indicated in FIG. 9, and as explained in detail in the aforesaid copending Chang application. These measurements are added and divided by 2 in an adder 206a, the output on line 208a representing the true displacement of the center S of the runout circle C (FIG. 9) from the X axis Xo—Xo. The output of adder 206a is inverted and applied to an adder 210a which also continuously receives measured wheel camber angles Y from the Y counter circuit 170. The output of the adder 210a is the runout correction in camber $\Delta Y$ which is anded in an AND gate 212a with a LOAD signal from the runout switch RO. The runout correction thus enters a temporary storage register 214a which stores the correction for use during subsequent camber measurements.

When the wheel is stopped at a point X, Y of FIG. 9, the register 214a will contain the runout correction $\Delta Y$ in camber. The runout switch RO is now opened, and value of $\Delta Y$ stored in the register 214a is inverted and enters a second adder 216a as $(-\Delta Y)$. The wheel is set down, and the new measured wheel camber reading Y' of the lowered wheel enters the adder 216a from the Y counter circuit 170. The output 218a of the second adder 216a enters a camber register 220a as true left front wheel camber, that is, measured camber corrected for runout.

The true camber signals in the register 220a are decoded by a binary-to-seven segment decoder 222a and are displayed as degrees and fractions thereof in the left camber display 159a (FIG. 12). The caster, camber and toe displays 158–160 comprise seven segment numerical displays by light emitting diodes such as the 5082-7730 units made by Hewlett Packard Corporation, Palo Alto, California.

In a similar manner, the runout correction circuit 200b computes the runout connection $\Delta X$, combines it with measured toe X' with the wheel set down, and displays measured toe corrected for runout in the left toe display 160a.

Caster

The caster angle of a front wheel is shown in the diagram of FIG. 7. In the system of the present invention, the caster angle is measured by rotating the front wheels to the left and to the right through a predetermined angle, as previously mentioned, and this causes a respective upward tilting and downward tilting of the wheel mirrors 16a, 16b in the vertical plane producing the caster measurement points Ycr and Ycl shown in the target diagram of FIG. 9.

Referring to the diagram of FIG. 13, a caster switch CS is provided, which is shown in its "off" position in that diagram. The caster circuit is shown in a dashed box 230 and is connected to an AND gate 232 which continuously receives camber position measurements Y from the Y counter 170. When the caster switch CS is in its "off" position, an AND gate 232 is enabled to permit register 234 to receive the first caster measurement signal. The wheels are then turned (about 15°) to the left (for example) until the reflection of the beam from the left wheel wing mirror 16L (previously described) strikes the left target array 20a at a point Ycl along the zero toe line Zt which is also the vertical reference line Yo—Yo. This measurement, represented by the point Ycl in FIG. 9, enters the caster register 234, is inverted, and is passed on as (−) Ycl to the adder 236.

The caster switch CS is then turned to its "on" position thereby fixing the first caster reading (−) Ycl in the caster register 234, and the front wheels are turned to the right until the beam is reflected from the rear wing mirror 16R and again strikes the target array 20a on the zero toe line Zt at point Ycr (FIG. 9). This method of turning the wheels while observing the beam spot on the target insures that the total rotation of the wheels during the caster measurement is 30°, an angle which is assumed in making the caster calculations. The new vertical displacement of the beam Ycr enters the adder 236 directly along with the inverted value (−) Ycl from the caster register 234 and the adder 236 forms the subtraction (Ycr−Ycl) to produce the caster measurement in digital form on line 238. This difference is, in effect multiplied by a calculated constant K and converted by a binary decoder 240 which provides the correct caster angle in appropriate decoded form for the display 158a and presents it to an AND gate 242. The calculated value of caster is displayed in the left caster display 158a, previously described, by light emitting diodes or the like as degrees and fractions of a degree. The caster display 158a may be the same type of unit as the units 159a, 160a employed for the camber and toe displays previously mentioned.

From the foregoing description it can be seen that the apparatus for measuring wheel alignment of motor vehicles can be used for quick and accurate measuring of caster, camber and toe of motor vehicle wheels without any complex calculations by the operator. The apparatus can be quickly and easily aligned with the vehicle by simple adjustment of the roof mirrors, light source and target arrays. Calculations of the desired angles of caster, camber and toe are made in digital form employing commercially available electronic circuit components and special light beam responsive grid-like targets. The ease of aligning the apparatus with the vehicle, the floating zero feature, and the electronic calculations make the apparatus relatively simple to set up and operate.

Although the preferred embodiment of the invention includes angles between the mirrors of each of the roof mirror sets 58a, 59a; 58b, 59b; 96a, 98a and 96b, 98b of 45°, the same effect of providing a net reflected angle of 90° which does not change within a range of changes of the angles of the incident beams can be provided by employing roof mirror sets (not shown) having an included angle of 135°. The aforesaid two types of roof mirrors can be defined generically as mirror sets wherein the included angle between the two mirrors is less than 180° and is an odd multiple of 45°. Also, instead of providing discrete mirrors, reflecting surface prisms having the same optical properties can be employed, as is well known in the art of optics. Hence, in the specification and appended claims, the term "roof mirror" encompasses the aforesaid structures and their optical equivalents.

Although the best modes contemplated for carrying out the present invention have been herein shown and described, it will be apparent that modification and variation may be made without departing from what is regarded to be the subject matter of the invention as defined in the appended claims.

What is claimed is:

1. Apparatus for measuring wheel alignment of a motor vehicle comprising:

light source means for projecting at least one primary beam of light originating from said light source means in a direction determined by the orientation of the source;

means for adjusting said source means to change the direction of said primary beam in the horizontal plane;

primary mirror means for receiving said primary beam and reflecting two beams therefrom in a parallel manner, said primary mirror means comprising a plurality of reflecting surfaces for reflecting both reflected beams generally parallel to the axis of the vehicle, said reflecting surfaces being angularly disposed for maintaining the angle between the incident primary beam and the reflected beams constant through a range of changes in the direction of the incident primary beam whereby adjusting the direction of said primary beam effects any adjustment required to align the reflected beams with the vehicle axis;

mirror means mounted on the wheel to be aligned for receiving said reflected beam from said primary mirror means;

a target positioned at a predetermined distance from said wheel mirror means for receiving the beam reflected therefrom for indicating the alignment of said wheel; and relay mirror means for receiving said reflected beams from said primary mirror means and for reflecting them to said wheel mirror means and for receiving the reflected beams from said wheel mirror means and for reflecting them to said target, said relay mirror means adapted to maintain a constant angle between any incident beam and the associated reflected beam through a range of changes in the direction of the incident beam.

2. The apparatus of claim 1, comprising housing means for rotatably mounting said relay mirror means, 180° light reflecting prism means in said housing means, means providing for laterally shifting said relay mirror housing means to a predetermined distance from the associated wheel mirror means, said prism means returning an incident beam from said primary mirror means back to said target when said housing means is rotated to one position and is at said predetermined spacing for establishing a reference point on said target, said relay mirror means reflecting an incident beam from said primary mirror means to said wheel mirror means when said relay mirror housing means is rotated to another position while remaining at said predetermined spacing.

3. The apparatus of claim 1, wherein said target comprises a light beam responsive grid having horizontal and vertical Cartesian coordinates, measurement circuit means connected to said grid for providing signals representing the position of a beam intercepted by said grid along each coordinate, correction circuit means for establishing a reference point on said grid whereby the measurement circuit means is automatically calibrated for different vehicle positions, register circuit means for storing the measurement position signals of said beam along said horizontal and vertical coordinates relative to said zero reference point, and display circuit means for respectively displaying said position signals as toe and camber angles.

4. Apparatus for measuring wheel alignment of a motor vehicle comprising:
light source means for projecting at least one primary beam of light originating from said light source means in a direction that is generally transverse to the vehicle axis and which is determined by the orientation of the source;
left and right primary mirror means disposed at opposite sides of the vehicle for receiving a primary beam; said primary mirror means each comprising a plurality of reflecting surfaces for reflecting the associated incident primary beam along opposite sides of the vehicle, said reflecting surfaces being angularly disposed for maintaining the angle between the incident primary beam and the reflected beam constant through a range of changes in the direction of the incident primary beam;
said left and right primary mirror means providing mutually parallel reflected beams projecting along the right and left sides of the vehicle;
mirror means mounted on the left and right front wheels to be aligned;
left and right beam position revealing means disposed at predetermined distances from their associated wheel mirror means for revealing the position of the light beams respectively reflected from said left and right primary mirror means;
left and right front targets associated with their respective primary mirror means for determining the position of a beam of intercepted light reflected from said wheel mirror means;
means for simultaneously shifting said primary mirror means and their associated targets laterally of the vehicle;
means for adjusting said source means to change the directions of said mutually parallel beams reflected by said primary mirror means;
and left and right rear targets disposed at predetermined distances from their associated rear wheels for indicating the initial interception positions of said parallel reflected primary beams, which position is determined by said reflected beam position revealing means, said front targets and source means being respectively reshiftable and re-adjustable so that said rear targets intercept their respective reflected primary beams at positions each of which represent the average of said initial intercepted positions, thereby initially aligning said reflected primary beams parallel to the vehicle axis for subsequent front wheel alignment procedures that employ said reflected parallel primary beams.

5. The apparatus of claim 4, wherein said left and right beam position revealing means each includes a pivoted housing, 180° light reflecting prism means in each housing for returning beams reflected from said primary mirror means back to their associated front targets when said housings are pivoted to one position for establishing reference points on said front targets, and relay roof mirror means in said housings for reflecting beams reflected from said primary mirror means through a net angle of 90° to said wheel mirror means when said housings are pivoted to another position for measuring toe and camber angles of the front wheels.

6. Apparatus for measuring wheel alignment of a motor vehicle comprising:
light source means for projecting a primary beam of light originating from said light source means in a direction determined by the orientation of the source;
means for readjusting said source means to change the direction of said primary beam;
primary mirror means for receiving said primary beam; said primary mirror means comprising a plurality of reflecting surfaces for reflecting the incident primary beam parallel to the axis of the vehicle, said mirror means surfaces being angularly disposed for maintaining the angle between the primary beam and the reflected beam constant through a range of changes in the direction of the incident primary beam;
mirror means mounted on the wheel to be aligned;
relay mirror means for reflecting the beam from said primary mirror means to said wheel mirror means;
said relay mirror means also comprising a plurality of reflecting surfaces that are angularly disposed for maintaining the angle between their incident and reflected beams constant through a range of changes in direction of the incident beam; and
a target for determining the position of a beam of intercepted light relative to a reference point;
said relay mirror means reflecting a beam from said wheel mirror means to said target for determining the alignment of said wheel relative to the reference point on said target.

7. The apparatus of claim 6, wherein said primary and relay mirror means are roof mirrors.

8. The apparatus of claims 6 or 7, wherein said relay mirror means are associated with a 180° light reflecting prism, and means for rotating said relay mirror means and associated prism wherein said prism reflects light received from said primary mirror means back to said target for determining said reference point on the target relative to the position of a beam reflected back to the target from said wheel mirror and relay mirror means.

9. The apparatus of claim 6 wherein said light source means comprises a laser beam source.

10. Apparatus for measuring wheel alignment of a motor vehicle comprising:
a light source means for projecting at least one primary beam of light originating from said light source means in a direction that is generally transverse to the vehicle axis and which is determined by the orientation of the source;

means for adjusting said source to change the direction of said primary beam;

left and right primary mirror means disposed at opposite sides of the vehicle for receiving a primary beam; said primary mirror means each comprising a roof mirror for reflecting their respective incident primary beam through a net angle of 90° for providing two mutually parallel reflected beams projecting along the right and left sides of the vehicle.

mirror means mounted on the left and right wheels to be aligned;

left and right relay mirror means for reflecting an associated incident parallel beam to the mirror means on the associated wheel;

said relay mirror means each comprising roof mirror means for reflecting the associated incident parallel beam through a net angle of 90°;

means for positioning each of said relay mirror means equidistant from its associated wheel mirror means;

left and right front targets for indicating the position of a beam of intercepted light relative to a reference point for each wheel;

said left and right relay mirror means reflecting the beams from the wheel mirror means to their associated targets for indicating the alignment of said wheels relative to reference points on their associated targets.

11. The apparatus of claim 10, wherein said relay mirror means include left and right beam position revealing means disposed at predetermined distances from their associated wheel mirror means for revealing the position of the light beams respectively reflected from said left and right primary mirror means;

means for shifting said primary mirror means and their associated targets laterally of the vehicle;

means for adjusting said source means to change the directions of said mutually parallel beams reflected by said primary mirror means;

and left and right rear targets disposed at predetermined distances from their associated rear wheels for indicating the initial interception positions of said parallel reflected primary beams, which positions are determined by said reflected beam position revealing means, said front targets and source means being respectively re-shiftable and re-adjustable so that said rear targets intercept their respective reflected primary beams at positions each of which represent the average of said initial intercepted positions, thereby initially aligning said reflected primary beams parallel to the vehicle axis for subsequent front wheel alignment procedures that employ said relay and wheel mirror means.

12. The apparatus of claim 11, wherein said left and right beam position revealing means each includes a pivoted housing, 180° light reflecting prism means in each housing for returning beams reflected from said primary mirror means back to the associated front targets when said housings are pivoted to one position for establishing reference points on said front targets, said relay mirror means also being mounted in said housings for reflecting beams reflected from said primary mirror means through a net angle of 90° to said wheel mirror means when said housings are pivoted to another position for measuring toe and camber angles of the front wheels.

13. Apparatus for measuring wheel alignment of a motor vehicle comprising:

light source means for projecting at least one primary beam of light originating from said light source means in a direction determined by the orientation of the source;

means for adjusting said source means to change the direction of said primary beam in the horizontal plane;

primary mirror means for receiving said primary beam and reflecting two beams therefrom in a parallel manner, said primary mirror means comprising a plurality of reflecting surfaces for reflecting both reflected beams generally parallel to the axis of the vehicle, said reflecting surfaces being angularly disposed for maintaining the angle between the incident primary beam and the reflected beams constant through a range of changes in the direction of the incident primary beam whereby adjusting the direction of said primary beam effects any adjustment required to align the reflected beams with the vehicle axis;

mirror means mounted on the wheel to be aligned for receiving said reflected beam from said primary mirror means; and a target positioned at a predetermined distance from said wheel mirror means for receiving the beam reflected therefrom for indicating the alignment of said wheel wherein said target comprises a light beam responsive grid having horizontal and vertical Cartesian coordinates, measurement circuit means connected to said grid for providing signals representing the position of a beam intercepted by said grid along each coordinate, correction circuit means for establishing a reference point on said grid whereby the measurement circuit means is automatically calibrated for different vehicle positions, register circuit means for storing the measurement position signals of said beam along said horizontal and vertical coordinates relative to said zero reference point, and display circuit means for respectively displaying said position signals as toe and camber angles.

* * * * *